US012587439B2

(12) United States Patent (10) Patent No.: US 12,587,439 B2
Volkening (45) Date of Patent: Mar. 24, 2026

(54) MULTI-CLOUD INDUSTRIAL CONTROLLER

(71) Applicant: WAGO Verwaltungsgesellschaft mbH, Minden (DE)

(72) Inventor: Dirk Volkening, Petershagen (DE)

(73) Assignee: Wago Verwaltungsgesellschaft mbH, Minden (DE)

( * ) Notice: Subject to any disclaimer, the term of this patent is extended or adjusted under 35 U.S.C. 154(b) by 630 days.

(21) Appl. No.: 17/865,143

(22) Filed: Jul. 14, 2022

(65) Prior Publication Data

US 2022/0350311 A1 Nov. 3, 2022

Related U.S. Application Data

(63) Continuation of application No. PCT/EP2021/050083, filed on Jan. 5, 2021.

(30) Foreign Application Priority Data

Jan. 15, 2020 (DE) ..................... 10 2020 200 453.6

(51) Int. Cl.
*H04L 12/24* (2006.01)
*H04L 41/08* (2022.01)
(Continued)

(52) U.S. Cl.
CPC .......... *H04L 41/08* (2013.01); *H04L 41/0803* (2013.01); *H04L 67/10* (2013.01); *H04L 67/12* (2013.01); *G05B 2219/32404* (2013.01)

(58) Field of Classification Search
CPC ..... H04L 41/08; H04L 41/0803; H04L 67/10; H04L 67/12; G05B 2219/32404;
(Continued)

(56) References Cited

U.S. PATENT DOCUMENTS 6,032,203 A * 2/2000 Heidhues ................ H04L 69/18
709/236
7,565,351 B1 * 7/2009 Callaghan .......... G05B 19/0426
(Continued)

FOREIGN PATENT DOCUMENTS

CN 104580349 A 4/2015
CN 108289123 A 7/2018
(Continued)

OTHER PUBLICATIONS

International Search Report dated Apr. 16, 2021 in corresponding application PCT/EP2021/050083.
(Continued)

*Primary Examiner* — Moustafa M Meky
*Assistant Examiner* — Elizabeth Kassa
(74) *Attorney, Agent, or Firm* — Muncy, Geissler, Olds & Lowe, P.C.

(57) ABSTRACT

An industrial controller including a controller for controlling one or multiple field bus(es) in an automation system, first pieces of configuration information for configuring a communication link to a first cloud platform, second pieces of configuration information for configuring a communication link to a second cloud platform, and to for transfer process data of the automation system to the first and the second cloud platform.

10 Claims, 4 Drawing Sheets

(51) Int. Cl.
    *H04L 41/0803*     (2022.01)
    *H04L 67/10*     (2022.01)
    *H04L 67/12*     (2022.01)

(58) Field of Classification Search
    CPC ........... G05B 19/0423; G05B 19/0426; G05B 19/41845; G05B 19/4185; G05B 2219/31001; Y02P 90/80
    USPC ........................................................ 709/223
    See application file for complete search history.

(56) References Cited

U.S. PATENT DOCUMENTS

| | | | |
|---|---|---|---|
| 10,334,048 B2 | 6/2019 | Maturana et al. | |
| 10,482,063 B2 | 11/2019 | Maturana et al. | |
| 10,601,634 B2 | 3/2020 | Hayashi et al. | |
| 10,740,293 B2 | 8/2020 | Maturana et al. | |
| 2006/0206442 A1* | 9/2006 | Hartman ............... | G06F 9/4488 706/20 |
| 2012/0226368 A1* | 9/2012 | Thomson ........... | G05B 19/0426 700/87 |
| 2013/0144406 A1* | 6/2013 | Blei ..................... | G05B 19/054 700/28 |
| 2013/0211546 A1* | 8/2013 | Lawson .................... | G06F 1/14 700/9 |
| 2014/0163739 A1* | 6/2014 | Thomson ............. | G05B 19/042 700/275 |
| 2015/0106504 A1 | 4/2015 | Astigarraga et al. | |
| 2015/0371160 A1* | 12/2015 | Weatherhead ...... | H04L 41/0846 705/7.12 |
| 2016/0021185 A1 | 1/2016 | De Sene et al. | |
| 2016/0197778 A1* | 7/2016 | Jones ................... | G05B 19/056 709/222 |
| 2016/0274552 A1* | 9/2016 | Strohmenger ......... | G06Q 10/06 |
| 2017/0041189 A1* | 2/2017 | Aswathanarayana ... | H04L 67/34 |
| 2017/0212699 A1* | 7/2017 | Hioka ................... | G06F 3/0659 |
| 2017/0339013 A1* | 11/2017 | Allen .................... | H04L 41/145 |
| 2018/0052451 A1* | 2/2018 | Billi-Duran ...... | G05B 19/41835 |
| 2019/0050414 A1* | 2/2019 | Maturana .............. | G06F 16/164 |
| 2019/0250686 A1* | 8/2019 | Allahut .............. | G05B 19/0426 |
| 2020/0394174 A1 | 12/2020 | Mayer et al. | |

FOREIGN PATENT DOCUMENTS

| | | | | |
|---|---|---|---|---|
| CN | 110609152 A | 12/2019 | | |
| DE | 102016124348 A1 | 6/2018 | | |
| EP | 2924570 A2 * | 9/2015 | ........... | G05B 13/042 |
| EP | 3346381 A1 | 7/2018 | | |
| EP | 3444689 A1 | 2/2019 | | |
| EP | 2924573 B1 | 6/2019 | | |
| WO | WO2019011603 A1 | 1/2019 | | |

OTHER PUBLICATIONS

Office Action for Chinese Patent Application No. 20218000770.6 mailed on Mar. 20, 2025.

\* cited by examiner

MULTI-CLOUD INDUSTRIAL CONTROLLER

This nonprovisional application is a continuation of International Application No. PCT/EP2021/050083, which was filed on Jan. 5, 2021, and which claims priority to German Patent Application No. 10 2020 200 453.6, which was filed in Germany on Jan. 15, 2020, and which are both herein incorporated by reference.

BACKGROUND OF THE INVENTION

Field of the Invention

The present invention relates to the field of industrial automation and, in particular, to an industrial controller, a system, a computer program and corresponding methods for communicating with multi-cloud solutions.

Description of the Background Art

The so-called fourth industrial revolution, also known as Industry 4.0, is considered a driver of the global economy. In this connection, companies try to further improve their production processes by digitally networking machines and data within the scope of the "Internet of Things" (IoT).

To have sufficient storage capacities and computing power available in the case of high utilization during continuous operation as well as under peak loads, more and more industrial enterprises make use of additional external IT infrastructures within the scope of so-called cloud computing. Cloud computing is generally understood to be an IT infrastructure which is made available, for example over the Internet, and generally provides storage space, computing power and/or applications (software as a service (SaaS)). In other words, cloud computing describes the approach of providing IT infrastructure via a computer network without it having to be installed locally.

A multiplicity of cloud solutions from different providers have now become established, which provide particular services or applications. For example. WAGO Cloud of the applicant permits the central collection and analysis of machine and plant data as well as the management, monitoring and control of automation systems. Another example is the IBM cloud platform, which provides functionalities for maintaining automation systems within the scope of so-called "predictive maintenance" with the aid of its AI solution IBM Watson. The existing cloud solutions each have different strengths and weaknesses for Industry 4.0, so that it is desirable to connect an automation system to multiple different cloud solutions at the same time for the purpose of combining the particular strengths.

A difficulty here, however, is that only one cloud provider is typically configurable in the industrial controllers in use today, so that the advantages of multiple cloud-based solutions may not be made directly usable.

Instead of configuring the cloud provider in the controller, it is furthermore known to establish the cloud connection by means of a dedicated add-on component within the automation system. For example, the European Patent EP 2 924 573 B1, which corresponds to US 2015/0281355, discloses a cloud agent, which collects industrial data in the field ("on-premise") from the controller or other field devices and transfers them to a cloud platform for the purpose of further analysis. However, no connection to multiple cloud-based solutions is provided in this system either.

SUMMARY OF THE INVENTION

It is therefore an object of the present invention to provide multiple, possibly different, cloud platforms easily, seamlessly and/or robustly usable in an automation system and thus to at least partially overcome the disadvantages of the prior art described above.

The present invention achieves this object via an industrial controller, a system, a method and a computer program, which are defined in the independent patent claims. Preferred refinements are defined in the subclaims.

An aspect of the invention relates to an industrial controller, for example, a programmable logic controller (PLC), which is generally referred to below as a controller. The industrial controller preferably comprises commercially available regulators for regulating, controlling and/or communicating with one or multiple field devices in an automation system. While the specific configuration of the field devices is of secondary importance for the present invention, these field devices may be, for example, sensors, measuring devices, actuators, switches, terminals, message displays, industrial robots, production machines or any other type of industrial devices. The present invention is thus accessible to numerous applications in industrial automation, for example in production equipment, batch control systems and/or monitoring systems. The term, automation system, is to be generally understood here and comprises industrial plants as well as embedded systems, such as automobiles or other devices.

The industrial controller has first and second pieces of configuration information for configuring a communication link to a first and a second cloud platform, or storage for storing the first and second pieces of configuration information. As mentioned at the outset, a cloud platform is to be understood here as an IT infrastructure, which communicates with the automation system and thus with the industrial controller via a network, in particular the Internet, and which provides storage space, computing power and/or applications. A cloud platform may be, but does not have to be, operated by a provider who is different than the operator of the automation system.

In contrast to the known controllers explained at the outset, the industrial controller may thus be configured to communicate with multiple cloud platforms, whereby a native multi-cloud connection is made possible for the first time. The proposed approach further differs from known concepts in which additional cloud agents are provided in that the cloud connection is configurable directly in the industrial controller, and thus no add-on components are necessary, which keeps the complexity of the infrastructure low.

The pieces of configuration information are preferably configured or stored in the firmware of the industrial controller, i.e., the aforementioned storage may be the firmware of the controller. A particularly seamless multi-cloud connection is provided hereby, since the conventional hardware and software configuration of the industrial controller may be used without special requirements and equipment features of the controller being necessary.

The applicant has recognized that a particularly advantageous separation of the configuration and application results from the firmware implementation, similarly to other mechanisms known to the customer. For example, a VPN connection may be configured and only used later on. According to this aspect of the invention, this principle is also facilitated in the cloud connectivity. Moreover, the implementation in the firmware also results in performance advantages over a purely application-based solution. In terms of error analysis, the implementation in the firmware also makes it possible to comparatively quickly determine where errors occur when connection problems arise. No application is necessary for the pure connection. Therefore, if an error occurs, it quickly becomes clear that the error has to do with the configuration. If the application is loaded to the controller later on, and an error occurs, it is clear that the error lies here.

It is conventionally known to have the configuration and/or the caching take place, not in the controller firmware, but in the application. However, the applications is then correspondingly larger and more complex. The application must take on the handling in the case of connection disturbances, cache data and/or ensure that the correct data is published to the right broker. The error analysis also becomes more difficult, as already described above. The entire application becomes much more complex.

The library may be expanded and/or the cashing and/or the connection handling may be adapted for the firmware implementation, in particular, for the assignment of the data to the particular broker. Nevertheless, a downward compatibility may be ensured. For example, if a customer downgrades from a two-broker configuration to an old version, which supports only one configuration, this is easily possible by retaining the first connection and eliminating the second connection. If the customer uses a possibility with only one broker, this does not appear to be any different than before, and so no or only a few changes need to be made during programming.

The industrial controller can transfer process data of the automation system to the first and the second cloud platform. The process data may be any type of data which arise during the operation of the automation system and which are generated by the field devices and other components of the automation system.

The industrial controller may be configured to transfer the same process data to the first and second cloud platforms. Such a (possibly simultaneous) sending of data to multiple cloud platforms ensures redundancy and thereby increases failure tolerance.

In another aspect, the industrial controller may be configured to transfer different process data to the first and the second cloud platform. A corresponding distribution of data to multiple cloud platforms may be advantageously used for load distribution. It is also conceivable to carry out the distribution of the data according to certain criteria (e.g., processing speed, accuracy and/or regional selection criteria of the cloud solutions), whereby the cloud solution most suitable for the targeted data processing may be selected.

Both aspects may also be combined, i.e., some of the process data may be redundantly distributed and other processes may be selectively distributed.

The industrial controller may furthermore include a data distributor, which is configured to transfer the process data (or parts thereof) to an ERP system, a SCADA system and/or a visualization system, which permits a further use of the data.

The industrial controller explained above may also be provided in a system together with a gateway. The gateway may be configured to connect the industrial controller to the first and the second cloud platform. One technical advantage of a gateway of this type is the separation of the field level from the IT level, which increases security. It is important that the networks be separated by the gateway. Without a clean separation, potential attackers may penetrate critical structures more easily. In addition, a separate gateway may update the security side without influencing the automation systems. In other words, the customer's machine may continue to operate while a security patch is being loaded via the gateway. If the function were present on a device, a security update would require the machine to be shut down.

It is also conceivable to exchange pieces of information between the cloud platforms via a communication link between the first cloud platform and the second cloud platform. Results may thus be displayed in combined form, e.g., in one cloud platform.

The advantages of this aspect depend on the particular application. As a rule, cloud-based solutions have strengths in certain areas and weaknesses in other areas. For example, a first cloud solution A may offer a comprehensive dashboard, i.e., visualization possibilities for the data from the controller, which the customer may use, for example, to visualize and/or compare energy consumptions of two machines with the aid of trends. A second cloud system B may support analytics, i.e., special algorithms for data analysis, for example, to be able to predict when a machine must be maintained. In a case of this type, the aforementioned invention aspect provides to combine all (relevant) information, i.e., the dashboard and/or the prediction of when the machine must be maintained, in one display. Correspondingly, cloud solution A needs data from the controller to display the trends, and cloud solution B likewise needs data from the controller for the analytics. To be able to display this in one dashboard, cloud solutions A and B may exchange data.

The invention further relates to a method for connecting an industrial controller as described above to a first and a second cloud platform. The method may comprise the following steps: Configuring a communication link between the industrial controller and the first cloud platform and configuring a communication link between the industrial controller and the second cloud platform. The method may further comprise steps which correspond to all functionalities described above in connection with the industrial controller and the system.

Finally, a computer program is provided. The computer program comprises instructions for implementing the above method, the program preferably being implemented in a firmware of the industrial controller.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
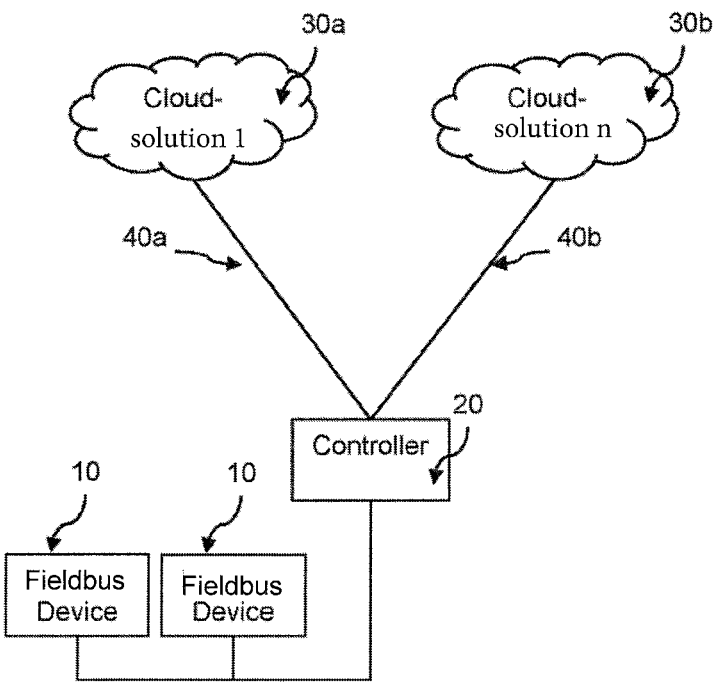
FIG. 1 shows a schematic representation of a multi-cloud-capable industrial automation system according to an example.

FIG. 1 shows a schematic representation of an industrial automation system. An industrial controller 20 (hereinafter also referred to as controller) communicates as illustrated with one or multiple field devices 10. The communication may take place, for example, via a field bus protocol and/or ETHERNET. Controller 20 further includes two communication links 40a and 40b to particular cloud platforms 30a and 30b. Communication links 40a and 40b may support the same or different protocols. At least one of the links may be based on the Message Queuing Telemetry Transport (MQTT) protocol.

It is understood that communication links 40a and 40b may be logical communication links, which may be set up via the same network connection (e.g., the Internet). Alternatively, it is possible that one cloud platform (e.g., cloud platform 30a) is connected via a remote network (e.g., the Internet), while the other cloud platform (e.g., cloud platform 30b) is connected via a LAN, WAN or the like. Of course, the configuration illustrated in FIG. 1 is greatly simplified, and the present invention may, in specific embodiments, also comprise further cloud platforms in addition to cloud platforms 30a and 30b illustrated as examples.

A difficulty with current Industry 4.0 applications and generally with connecting the field level to the cloud is that different cloud solutions or cloud suppliers (including their services) have different strengths, these, however, not being available within one platform. The configuration illustrated in FIG. 1 solves this problem in that controller 20 has pieces of configuration information for configuring particular communication links to first cloud platform 30a and second cloud platform 30b. Controller 20 may be parameterized hereby for multiple cloud platforms (which may also comprise IoT platforms and/or MQTT brokers). The pieces of configuration information, and thus the parameterization of controller 20, may take place directly in the firmware of controller 20.

Controller 20 thus makes it possible to use the advantages of multiple or even different cloud solutions on one controller, resulting in numerous technically advantageous use scenarios: simultaneously sending data to multiple cloud solutions (of the same type or different ones) to increase redundancy, reliability and/or error recognition. In this scenario, the connection to a cloud solution may be released without data being lost or the system operation being impaired. If the same application is running on both cloud platforms (e.g., a "control from the cloud" application), the reliability of the entire automation system is dramatically increased; distributing the data to multiple cloud solutions (of the same time or different ones) for the purpose of load distribution; and/or assigning the data to the cloud solution most suitable for the data processing in each case according to criteria (e.g., processing speed, accuracy, regional selection criteria of the cloud solutions).

Figure 2:
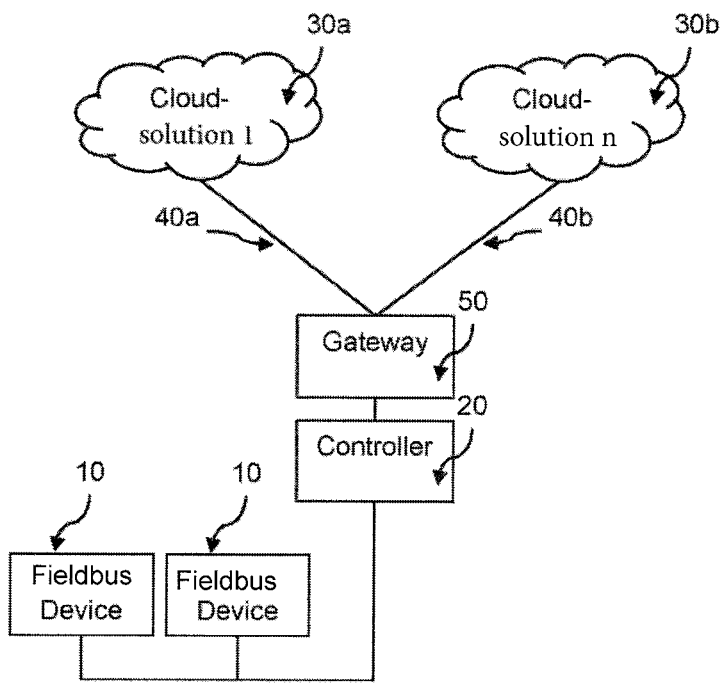
FIG. 2 shows a schematic representation of a multi-cloud-capable industrial automation system, including a gateway, according to an example.

FIG. 2 shows a system, which is largely similar to the system according to FIG. 1, but which includes an additional gateway 50. As illustrated, the communication between controller 20 and cloud platforms 30a and 30b does not take place here directly but rather via gateway 50. Optional gateway 50 is thus used for separation between the field and IT levels and increases security, due to this encapsulation.

Figure 3:
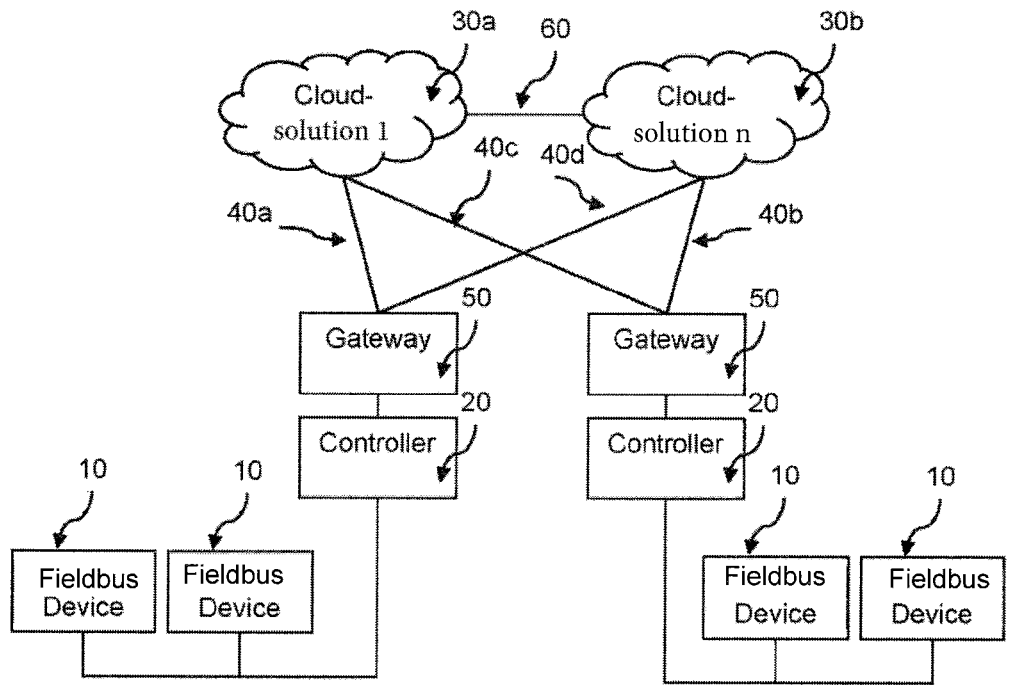
FIG. 3 shows a schematic representation of a multi-cloud-capable industrial automation system, including direct cloud communication, according to an example; and 5                                                                                      6

FIG. 3 shows that multiple controllers 20 (and corresponding field devices 10) may be connected to cloud platforms 30a and 30b with or without gateway 50. A direct communication link 60 between cloud platforms 30a and 30b is also provided in FIG. 3. Both aspects are combined in the illustrated exemplary embodiment, but it is understood that these aspects may also be provided independently of each other. For example, results may be combined in one solution with the aid of additional communication link 60 between cloud solutions 30a and 30b.

Figure 4:
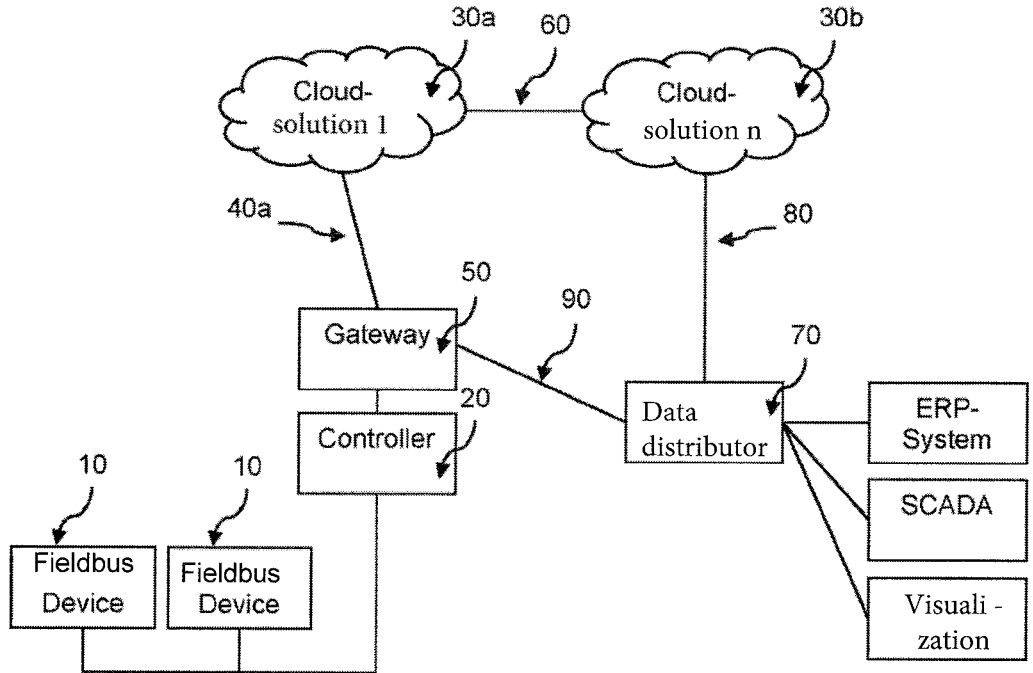
FIG. 4 shows a schematic representation of a multi-cloud-capable industrial automation system, including a data distributor, according to an example.

FIG. 4 shows an additional data distributor 70, with the aid of which the data may be transferred to other components of the automation system, for example an ERP system, a SCADA system and/or a visualization system. In the illustrated exemplary embodiment, data distributor 70 is implemented as an independent component, however, it may alternatively also be provided in controller 20 and/or in gateway 50.

A technical advantage of the present invention is, for example, the simultaneous parameterization of multiple, possibly different, cloud solutions in the area of automation systems within a controller, preferably within the controller firmware. The strengths of different cloud platforms may be advantageously combined hereby. In one application example, the device management within an automation solution may take place, for example, with the aid of WAGO Cloud (possibly including a firmware update for the controller(s)), and the predictive maintenance of IBM Watson may be used for the data analysis, the analysis results being able to be sent back to the controller from the cloud.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. An industrial controller comprising:
   a controller to control one or multiple field devices in an automation system;
   first pieces of configuration information for configuring a communication link from the controller to a first cloud platform;
   second pieces of configuration information for configuring a communication link from the controller to a second cloud platform; and
   an output for transferring process data of the automation system from the controller to the first and the second cloud platform,
   wherein the industrial controller is a programmable logic controller (PLC) and comprises firmware, and
   wherein the first and the second pieces of configuration information are stored in the firmware.

2. The industrial controller according to claim 1, wherein the industrial controller is configured to transfer the same process data to the first and the second cloud platform.

3. The industrial controller according to claim 1, wherein the industrial controller is configured to transfer different process data to the first and the second cloud platform.

4. The industrial controller according to claim 1, further comprising a data distributor to transfer the process data to an ERP system, a SCADA system and/or a visualization system.

5. The industrial controller according to claim 1, wherein each of the first cloud platform and the second cloud platform host multiple computing services and/or applications.

6. A system comprising:

an industrial controller according to claim 1; and a gateway configured to connect the industrial controller to the first and the second cloud platform.

7. The system according to claim 6, further comprising a communication link between the first cloud platform and the second cloud platform to exchange pieces of information between the first and the second cloud platform.

8. A method for connecting an industrial controller to a first and a second cloud platform, the method comprising:

configuring a communication link between the industrial controller and the first cloud platform; and configuring a communication link between the industrial controller and the second cloud platform, wherein the industrial controller is a programmable logic controller (PLC) and comprises firmware, and wherein first and the second pieces of configuration information for configuring the communication links are stored in the firmware.

9. A non-transitory computer-readable medium storing a computer program thereon that, when executed in the firmware of the industrial controller, causes the industrial controller to carry out the method according to claim 8.

10. The method according to claim 8, wherein each of the first cloud platform and the second cloud platform host multiple computing services and/or applications.

\* \* \* \* \*